US011265719B2

(12) United States Patent
McDaid et al.

(10) Patent No.: US 11,265,719 B2
(45) Date of Patent: Mar. 1, 2022

(54) DETECTING UNAUTHORISED NODES IN NETWORKS (71) Applicant: Adaptive Mobile Security Limited, Dublin (IE)

(72) Inventors: Cathal McDaid, Dublin (IE); Giulio De Vecchi, Treviso (IT)

(73) Assignee: ADAPTIVE MOBILE SECURITY LIMITED, Dublin (IE)

(*) Notice: Subject to any disclaimer, the term of this patent is extended or adjusted under 35 U.S.C. 154(b) by 254 days.

(21) Appl. No.: 16/287,188

(22) Filed: Feb. 27, 2019

(65) Prior Publication Data

US 2019/0268775 A1 Aug. 29, 2019

(51) Int. Cl.
*G06F 21/55* (2013.01)
*H04W 12/122* (2021.01)
*H04L 29/06* (2006.01)

(52) U.S. Cl.
CPC ........ *H04W 12/122* (2021.01); *G06F 21/552* (2013.01); *H04L 63/1408* (2013.01); *H04L 63/1425* (2013.01); *H04L 63/1466* (2013.01)

(58) Field of Classification Search
CPC ............... H04W 12/122; G06F 21/552; H04L 63/1408; H04L 63/1425; H04L 63/1466
See application file for complete search history.

(56) References Cited

U.S. PATENT DOCUMENTS

| | | | | |
|---|---|---|---|---|
| 6,501,950 B1* | 12/2002 | Smith | ................. | H04W 12/126 455/423 |
| 6,768,787 B1* | 7/2004 | Pester, III | ............. | G06F 11/327 370/241 |
| 7,027,809 B1* | 4/2006 | Smith | .................. | H04Q 3/0087 455/423 |
| 7,184,538 B1* | 2/2007 | Doskow | .............. | H04L 63/0227 370/352 |
| 7,218,613 B1* | 5/2007 | Doskow | .................. | H04L 43/00 370/252 |
| 7,360,090 B1* | 4/2008 | Doskow | .................. | H04L 63/08 713/170 |
| 8,015,294 B2* | 9/2011 | Bugenhagen | ....... | H04L 12/1403 709/227 |
| 8,407,765 B2* | 3/2013 | Wiley | ................. | H04W 12/088 726/4 |
| 8,582,567 B2* | 11/2013 | Kurapati | ............. | H04L 63/0823 370/356 |

(Continued)

*Primary Examiner* — Joseph P Hirl
*Assistant Examiner* — Stephen T Gundry
(74) *Attorney, Agent, or Firm* — Loza & Loza, LLP; Anthony Smyth (57) ABSTRACT

A method of detecting an unauthorised communication from a network node in a telecommunication network is disclosed, and a network node implementing the method. Network messages are received in the telecommunication network, and statistical patterns inherent to a sequence of received network messages are generated from a plurality of identifier values associated with a legitimate network node, wherein each identifier value has been encoded by the legitimate network node in a respective network message. An identifier value encoded in a subsequently-received network message of a signalling network node is then compared with one or more of the statistical patterns and one or more unsuccessful comparisons cause the signalling network node to be detected as an unauthorised network node.

13 Claims, 5 Drawing Sheets

(56) References Cited

U.S. PATENT DOCUMENTS

| | | | | |
|---|---|---|---|---|
| 9,225,609 | B2* | 12/2015 | McNaughton | H04L 12/66 |
| 9,479,341 | B2* | 10/2016 | Bugenhagen | H04L 45/28 |
| 9,813,433 | B2* | 11/2017 | McDaid | H04W 12/128 |
| 2003/0101357 | A1* | 5/2003 | Ronen | H04L 63/0272 |
| | | | | 726/23 |
| 2007/0121596 | A1* | 5/2007 | Kurapati | H04L 29/06027 |
| | | | | 370/356 |
| 2007/0159979 | A1* | 7/2007 | Butler | H04L 43/18 |
| | | | | 370/244 |
| 2008/0052394 | A1* | 2/2008 | Bugenhagen | H04L 45/22 |
| | | | | 709/224 |
| 2008/0052401 | A1* | 2/2008 | Bugenhagen | H04L 45/00 |
| | | | | 709/227 |
| 2008/0052784 | A1* | 2/2008 | Wiley | H04W 12/088 |
| | | | | 726/28 |
| 2012/0144051 | A1* | 6/2012 | Butler | H04L 43/022 |
| | | | | 709/230 |
| 2013/0301641 | A1* | 11/2013 | Anand | H04L 63/0263 |
| | | | | 370/389 |
| 2016/0006753 | A1* | 1/2016 | McDaid | H04L 63/1425 |
| | | | | 726/23 |
| 2016/0105802 | A1* | 4/2016 | Sauder | H04Q 3/0025 |
| | | | | 455/410 |
| 2016/0127908 | A1* | 5/2016 | Sporton | H04M 15/58 |
| | | | | 455/410 |

* cited by examiner

DETECTING UNAUTHORISED NODES IN NETWORKS

PRIORITY CLAIM

This application claims priority to and the benefit of European Patent Application No. 18159023.3 filed in the European Patent Office on Feb. 27, 2018, the entire content of this application being incorporated herein by reference as if fully set forth below in its entirety and for all applicable purposes.

FIELD

The present invention relates to a method and to a corresponding node for detecting instances of network node spoofing in telecommunication networks.

BACKGROUND

Signalling System number 7 ('SS7') is a set of telephony signalling protocols, which is used to set up and tear down telephone calls across global public switched telephone network (PSTN), that are still very widely used and interfaced with 2G and 3G cellular telephony networks.

A known and enduring weakness in SS7-based networks, is the possibility for an unauthorised user, for instance a network intruder, to masquerade as a legitimate network node and to engage with other legitimate network nodes in telecommunication over the SS7 Transaction Capabilities Application Part ('TCAP') protocol, querying these legitimate nodes for privileged data. To initiate a TCAP session, a transaction ID ('TID') uniquely identifying the session must be generated by the originating node, wherein legitimate originating TID generation is ordinarily coordinated in the legitimate source node. Accordingly, for purposes of intrusion, the unauthorised node TID must be spoofed, i.e. a TID must be generated by the unauthorised node, however necessarily without knowledge of how TIDs are being generated by the legitimate originating node in the network. Provided that the spoofed TID does not conflict with a TID in current use by the legitimate source node, then a destination node being attacked would have no indication that the TID, and thus session initiating message, is from an unauthorised node.

Some techniques have been developed to try and mitigate the above problem. A first example is disclosed in US 2005/243799, as method and a system for protecting signalling Connection Control Part (SCCP) messages from being spoofed and/or eavesdropped in SS7 networks. SCCP is a network layer protocol which provides extended routing, flow control, segmentation, connection-orientation and error correction facilities in SS7 telecommunications networks. The method disclosed in US'799 comprises checking the integrity of checksum in a SCCP message received, such that it may determine whether the message was altered or not, and originated from the correct location or otherwise. This method computationally-intensive and, whilst it may assist with mitigating unauthorised signalling activity by identifying unauthorised messaging, it does not assist with detecting the unauthorised signalling network node itself.

Another example is disclosed in US 2016/105802, assigned to Vodafone IP Licensing, describes a system for detecting undesirable signalling traffic in telecommunications networks, such as originating from suspicious nodes within an SS7 network, wherein the system monitors signalling from known nodes to learn and build signalling profiles which are stored in databases or the like, which may then be used as a comparison when an unknown network node commences signalling via the SS7 network, such that the node may be identified as suspicious and appropriate action may be taken. Another related patent publication number EP 3 018 876, assigned to Vodafone IP licensing Limited, discloses a similar system that operates at a network level. This patent publication proposes to build a statistical model for the packets sent and received for the different packet types and sources (GTs) but do not take account of the content of the packets. These methods are again computationally-intensive, and requires non-trivial amounts of data storage for storing the learned signalling models of reference. Moreover, its preferred implementation of a legacy 2G/3G mobile network architecture fails to consider portability issues and, importantly, opportunities provided by more modern network types.

Current industry statistics about mobile telephony networks indicate some 4.5 billion unique mobile subscribers and close to 8 billion global mobile connections. Approximately $\frac{1}{8}^{th}$ of these figures is representative of more recent, Internet Protocol ('IP')-based communication systems deployed as 4G mobile telephony networks, which do not support traditional circuit-switched telephony services.

Consequently, different protocols have been developed and adopted for mediating network node access and Diameter is one widely-adopted authentication, authorization, and accounting ('AAA') protocol in such networks. Mobile network operators are fast developing Long Term Evolution ('LTE') networks across the globe, but industry estimates still hold the migration of the $\frac{7}{8}^{th}$ balance of unique mobile subscribers, from legacy 2G and 3G networks to 4G networks, at a decade at least. Accordingly, mobile telephony network operators shall have to jointly administer and maintain existing SS7-based networks and Diameter-based networks during that time.

Accordingly, there is a requirement for an improved method of detecting spoofed nodes, extendable to networks operated under distinct access-negotiating protocols such as SS7, GTP and Diameter.

SUMMARY

The present invention mitigates shortcomings associated with the prior art of reference by providing a computer-implemented method of detecting unauthorised network nodes which generate unauthorized signalling traffic within a telecommunications network, in line with claim 1, and a network node embodying this method in accordance with claim 14.

The method of the invention is based on the analysis of how time-series of legitimate node transaction identifier values can be modelled during a training stage and predicted, wherein values generated by unauthorised nodes, which do not accord with one or more expected values for a given source node, can be determined and the unauthorised nodes associated with such determined values accordingly detected. For example, during a training stage an attacked network collects a number of identifiers such as a number of Transaction Capabilities Application Part—Originating Transaction Identifiers (TCAP-OTIDs) coming from a "Spoofed Network" and creates a statistical model for the sequence of such Originating Transaction Identifiers (OTIDs). During a monitoring stage the "Attacking Network" sends a message to the "Attacked Network" that will have to use a random value for the TCAP-OTID, as it does not know anything about how these OTIDs are generated by the "Spoofed Network". The "Attacked Network" checks the TCAP-OTID of the received packet with the expected one, based on the statistical model created during the training stage. If the TCAP-OTID does not match the expected range of values, then this packet can be marked as suspicious. The invention provides an analytical approach where during the training stage it looks into the values of one specific parameter of the packets (TCAP OTID) and try to find a pattern for it. Then during the monitoring stage it uses this pattern to check if the new packet should be accepted or not based on the value of this parameter. The information can be checked on a per packet basis.

According to an aspect of the present invention therefore, there is provided a method of detecting an unauthorised network node in a telecommunication network, comprising the steps of generating a first statistical pattern inherent to a sequence of network messages, from a plurality of identifier values associated with a legitimate network node, wherein each identifier value has been encoded by the legitimate network node in a respective network message; comparing an identifier value encoded in a subsequent network message of a signalling network node with the first statistical pattern; and when the comparison against the first pattern outputs a mismatch, declaring the signalling network node as unauthorised or suspicious.

Respective embodiments are provided for the most ubiquitous network protocols, namely SS7 for 2G/3G mobile telephony networks and Diameter for 4G mobile telephony networks, which share the common inventive concept of determining, from processing a particular field in network data packets corresponding to the unique network identifier associated with the originating network node, with one or more of a variety of computationally-inexpensive functions, an expected behaviour of the sender of the packets, then declaring any network data packet which does not substantially match the expected behaviour as an allegedly spoofed network data packet.

Accordingly, an embodiment of the method may comprise the further steps of generating a second statistical pattern inherent to the sequence of network messages, from the plurality of identifier values associated with the legitimate network node; comparing the identifier value encoded in the subsequent network message with the second statistical pattern; and when the comparison against the first and/or second pattern outputs a mismatch, declaring the signalling network node as unauthorised.

In an embodiment of the method, the or a first statistical pattern may be an invariant based on a subset of a bitmask in the plurality of identifier values associated with the sequence of network messages; thus the step of generating the first statistical pattern comprises the further steps of translating each of the plurality of identifier values into a respective bit string; identifying a position and value of at least one fixed bit common to the translated plurality of bit strings; and generating a bitmask from the identified fixed bits. Adverting to this embodiment, the step of comparing against the first pattern may usefully comprise the further steps of translating the identifier value encoded in the subsequent network message into a respective bit string; and comparing the respective bit string or its bitwise-inverse with the bitmask.

In an embodiment of the method particularly suited to SS7 telecommunication networks, the step of generating the second statistical pattern may comprise the further steps of translating each of the plurality of identifier values into a respective bit string $si$, sampling the translated bit strings $si_{1-N}$, identifying a field of n non-fixed bits in the sequence of samples, converting the identified n non-fixed bits to a decimal integer di, and calculating transition counts between successive decimal values $di_{1-N}$ in the sequence of samples to form the second statistical pattern.

The second statistical pattern may accordingly be a state-transition probability matrix Mopt of the sequence of decimal values. The step of comparing the identifier value encoded in the subsequent network message with the second statistical pattern may thus output a mismatch, when either $Mopt(di_{N-1},di_N)$ or $Mopt(di_N,di_{N+1})$ is equal to zero. In an alternative, the accuracy of the detection may be improved with a dual-condition, wherein the comparison step outputs a mismatch when both $Mopt(di_{N-1},di_N)$ and $Mopt(di_N,di_{N+1})$ are equal to zero. For any of these variants, a default count for n in the step of identifying the field of n non-fixed bits in the sequence of samples, should preferably be 3 or 4, as providing balance between the conflicting requirements of a sufficiently-representative count of transitions, versus computational expense. For any of these variants still, the identifier value is preferably an Originating Transaction Identifier ('OTID') in the Transaction Capabilities Application Part ('TCAP') protocol for SS7 networks. In one embodiment the matrix can be computed on a subset of the bitmask or on a subset of the bitmask composed of bits that have a statistical correlation between each other.

In another embodiment of the method particularly suited to Diameter telecommunication networks, the step of generating the second statistical pattern may instead comprise the further steps of determining at least one monotonically-increasing sequence of identifier values in the plurality of identifier values associated with the legitimate network node then, for each determined sequence, computing a linear regression of a sub-set of monotonically-increasing identifier values thereof, and calculating an expected value range for a next identifier value in the sequence. The step of comparing the identifier value encoded in the subsequent network message with the second statistical pattern may thus output a mismatch, when the identifier value encoded in the subsequent network message is outside the calculated expected value range. For any of these embodiments, each identifier value is either, or each of, a Hop-by-Hop Identifier and an End-to-End Identifier.

According to another aspect of the present invention, there is also provided a network node in a telecommunication network, comprising network interfacing means, data processing means and storage means storing a set of instructions which, when processed by the data processing means, configure the network node to receive network messages, generate a first statistical pattern inherent to a sequence of received network messages, from a plurality of identifier values associated with a legitimate network node, wherein each identifier value has been encoded by the legitimate network node in a respective network message, compare an identifier value encoded in a subsequent network message of a signalling network node with the first statistical pattern, and when the comparison against the first pattern outputs a mismatch, declare the signalling network node as unauthorised.

According to another aspect of the present invention, there is also provided a non-transitory computer-readable medium storing computer-executable instructions that, when executed by at least one processor, configure the at least one processor to receive network messages in a telecommunication network, to generate a first statistical pattern inherent to a sequence of received network messages, from a plurality of identifier values associated with a legitimate network node, wherein each identifier value has been encoded by the legitimate network node in a respective network message, to compare an identifier value encoded in a subsequent network message of a signalling network node with the first statistical pattern and, when the comparison against the first pattern outputs a mismatch, declare the signalling network node as unauthorised.

Other aspects of the present invention are as stated in the appended claims.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Throughout the following description, the following terms and acronyms shall be understood by the skilled reader under their conventional meaning in the art, briefly summarized as follows for the avoidance of doubt.

In the context of SS7 protocol-based telecommunication networks, Global Title ('GT') is an address used in the SCCP protocol for routing signalling messages in telecommunications networks, Transaction Capabilities Application Part ('TCAP') is a protocol for SS7 networks, and the Originating Transaction ID ('OTID') is a 32-bits unsigned integer number, being a TCAP reference for a set of TCAP operations that are performed within a single network dialog wherein, when a first node starts a TCAP dialog with a second node, the starting node sends a Begin message to the second node, and this Begin message contains an OTID, which is the Transaction ID reference for the starting node.

In the context of Diameter protocol-based telecommunication networks, the Origin-Host identifies the starting network endpoint which originated a network message, the Destination-Host identifies the destination network endpoint of the network message, and the Route-Record identifies intermediate endpoints that carried the network message from the Origin-Host to the Destination-Host. In that context, a Hop-by-Hop Identifier ('H-ID') is an unsigned 32-bit integer field which assists the matching of node requests and replies, wherein a sending node must ensure that the Hop-by-Hop Identifier in a request is unique on a given connection at any given time: under this requirement, the Hop-by-Hop Identifier is normally a monotonically-increasing number, i.e. a sequence of values which increases over time (with the exception of a "restart from zero" threshold when the maximum value for a 32-unsigned integer is reached), with a randomly-generated start value wherein, for each message, it is associated to the last host in the Route-Record. An End-to-End Identifier ('E-ID') is also an unsigned 32-bit integer field, but which is used to detect duplicate messages: nodes sending request messages must insert a unique identifier on each message, which must remain locally unique for a period of at least 4 minutes, even across reboots, and wherein the End-to-End Identifier must not be modified by Diameter agents of any kind.

Figure 1:
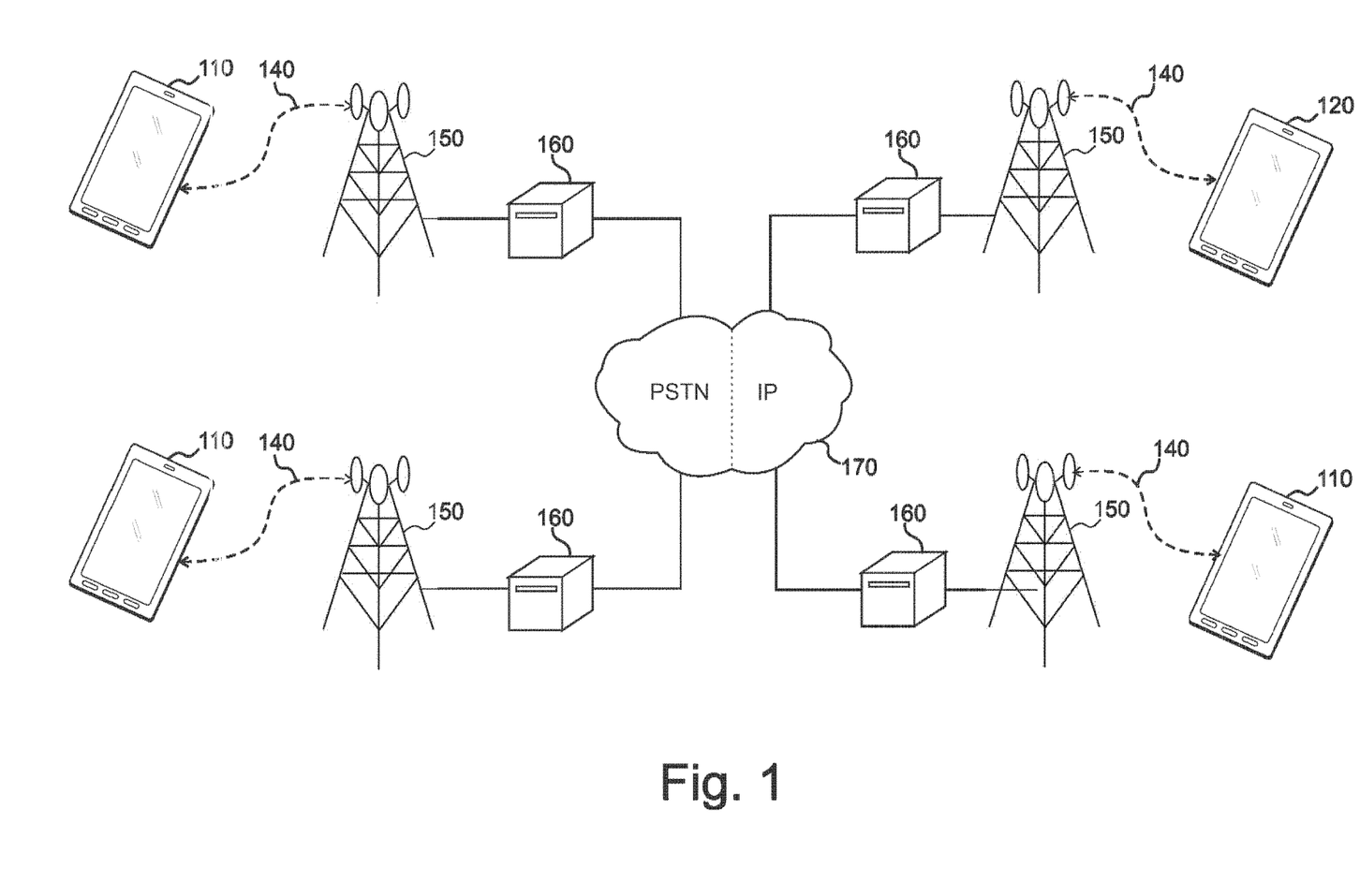
FIG. 1 illustrates a networked environment with a plurality of telecommunication devices comprising legitimate network nodes, a spoofed network node, and a detecting network node according to an embodiment of the invention.
Figure 2:
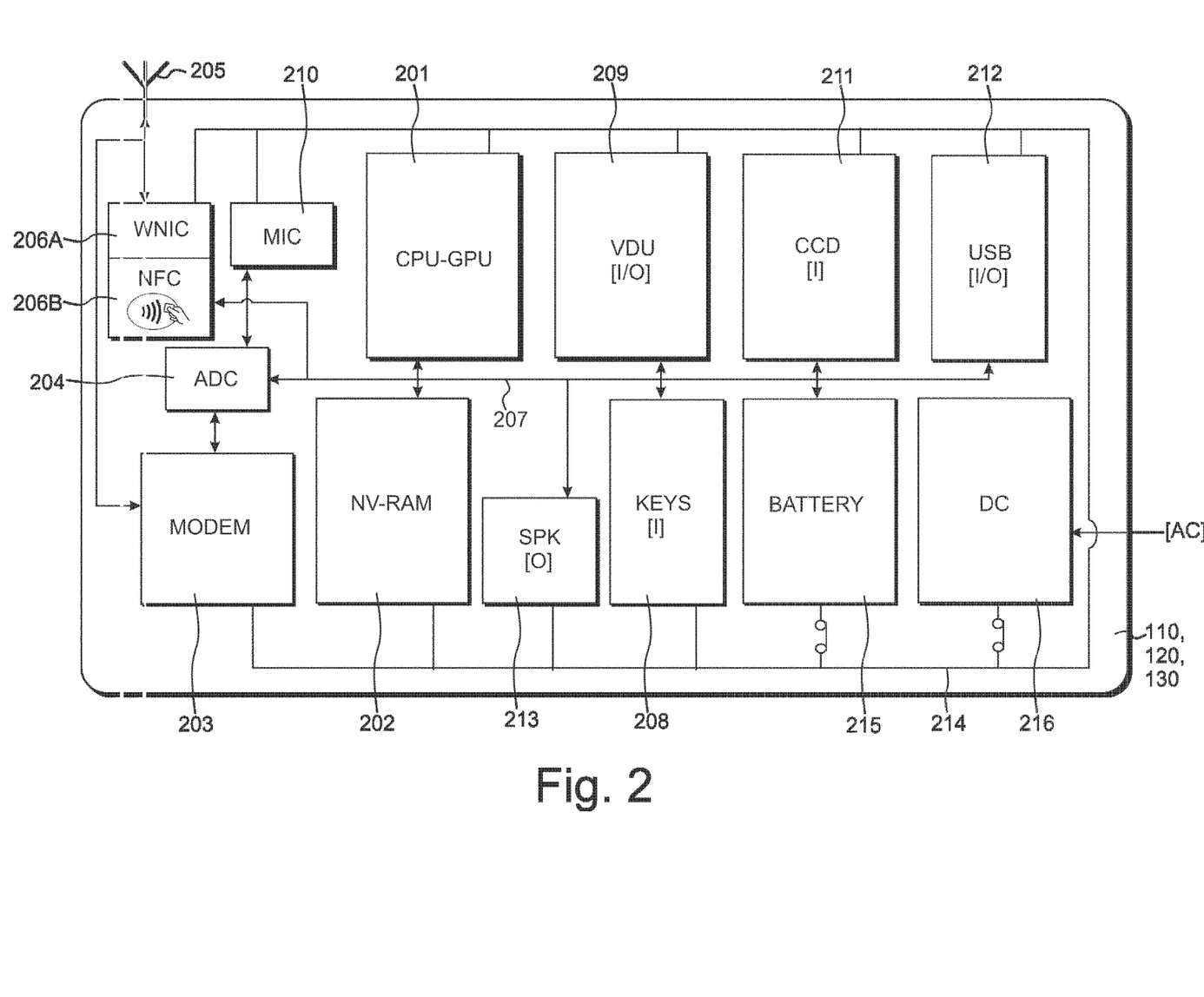
FIG. 2 shows a block diagram of the detecting network node in the environment of FIG. 1, including a memory, a processor and networking means.

Referring now to the figures and initially FIGS. 1 and 2, there is shown a networked environment with a plurality of telecommunication devices comprising legitimate network nodes 110, a spoofed network node 120, and a detecting network node 130 according to an embodiment of the invention.

Each node 110, 120, 130 is a mobile personal communication device emitting and receiving data, including voice and/or alphanumerical data, encoded as a digital signal over a wireless data transmission 140, wherein the signal is relayed respectively to or from the device 110, 120, 130 by the geographically-closest communication link relay 150 of a plurality thereof. The plurality of communication link relays $150_N$ allows digital signals to be routed between mobile devices 110, 120, 130 and their intended recipient by means of a remote gateway 160. Gateway 160 is for instance a communication network switch, which couples digital signal traffic between wireless telecommunication networks, such as the telecommunication network within which wireless data transmissions 140 take place, and other intermediary networks bridging protocol and distance between communicating nodes, such as public switched telephone networks ('PSTN') and Wide Area Networks ('WAN') generally denoted by the reference 170.

Network connectivity and interoperable networking protocols of each node 110, 120, 130 allow the devices to connect to one another and communicate data to and receive data from one another and, in that context, each gateway 160 provides further relevant protocol conversion if required, for instance if communicating nodes 110, 120, 130 use Mobile Application Part ('MAP') or Wireless Application Protocol ('WAP') signalling capabilities and SS7 transactional capabilities application part (TCAP) to transfer short messages between the network entities, or mobile IPv6 applications with Diameter Authentication, Authorization and Accounting ('AAA') SS7 transactional capabilities.

A typical hardware architecture of a network node 110, 120, 130 is shown in FIG. 2 in further detail, by way of non-limitative example. As skilled persons will readily understand, the substantially common hardware architecture of the mobile devices is designed for purposes of ergonomic handling and miniaturisation. Skilled persons should also readily understand however, that the principles described herein in association with the detecting network node 130 may be extended without difficulty to an alternative form of network-connected data processing terminal, such as a network server, having an architecture substantially similar to that of the mobile devices 110, 120, 130, albeit with components designed for durability and redundancy of operation, by contrast with the components of the mobile devices designed for improved portability.

The network node 130 thus firstly includes a data processing unit 201, for instance a general-purpose microprocessor, for instance conforming to the Cortex™ architecture manufactured by ARM™, acting as the main controller of the mobile device 120 and which is coupled with memory means 202, comprising volatile random-access memory (RAM), non-volatile random-access memory (NVRAM) or a combination thereof.

The network node 130 further includes networking means. Communication functionality is provided by a modem 203, which provides the interface to external communication systems, such as the GPRS, 3G or 4G/LTE cellular telephone network 150, 160, 170 shown in FIG. 1, associated with or containing an analogue-to-digital converter 204, which receives an analogue waveform signal through an aerial 205 from the communication link relay 150 and processes same into digital data with the data processing unit 201 or a dedicated signal processing unit. Alternative wireless communication functionality is provided by a wireless network interface card (WNIC) 206A, apt to interface the mobile device 130 with a wireless local area network generated by a local wireless router (not shown). Further alternative wireless communication functionality may be provided by a High Frequency Radio Frequency Identification (RFID) networking interface 206B implementing Near Field Communication (NFC) interoperability and data communication protocols for facilitating wireless data communication over a short distance with correspondingly-equipped devices.

The CPU 201, NVRAM 202 and networking means 203 to 206B are connected by a data input/output bus 207, over which they communicate and to which further components of each node 110, 120, 130 are similarly connected, in order to provide wireless communication functionality and receive user interrupts, inputs and configuration data. Accordingly, user input may be received from a data input interface 208, which for the mobile device 130 is a keypad with a limited number of multi-functional keys and/or a capacitive or resistive touch screen feature of the display unit 209. Further input data may be received as analogue sound wave data by a microphone 210, digital image data by a digital camera lens 211 and digital data via a Universal Serial Bus (USB) 212. Processed data is output as one or both of display data output to the display unit 209 and audio data output to a speaker unit 213. Power is supplied to the above components by the electrical circuit 214 of each network node, which is interfaced with an internal battery module 215, wherein the battery is periodically recharged on an ad hoc basis by an electrical converter 216.

Figure 3:
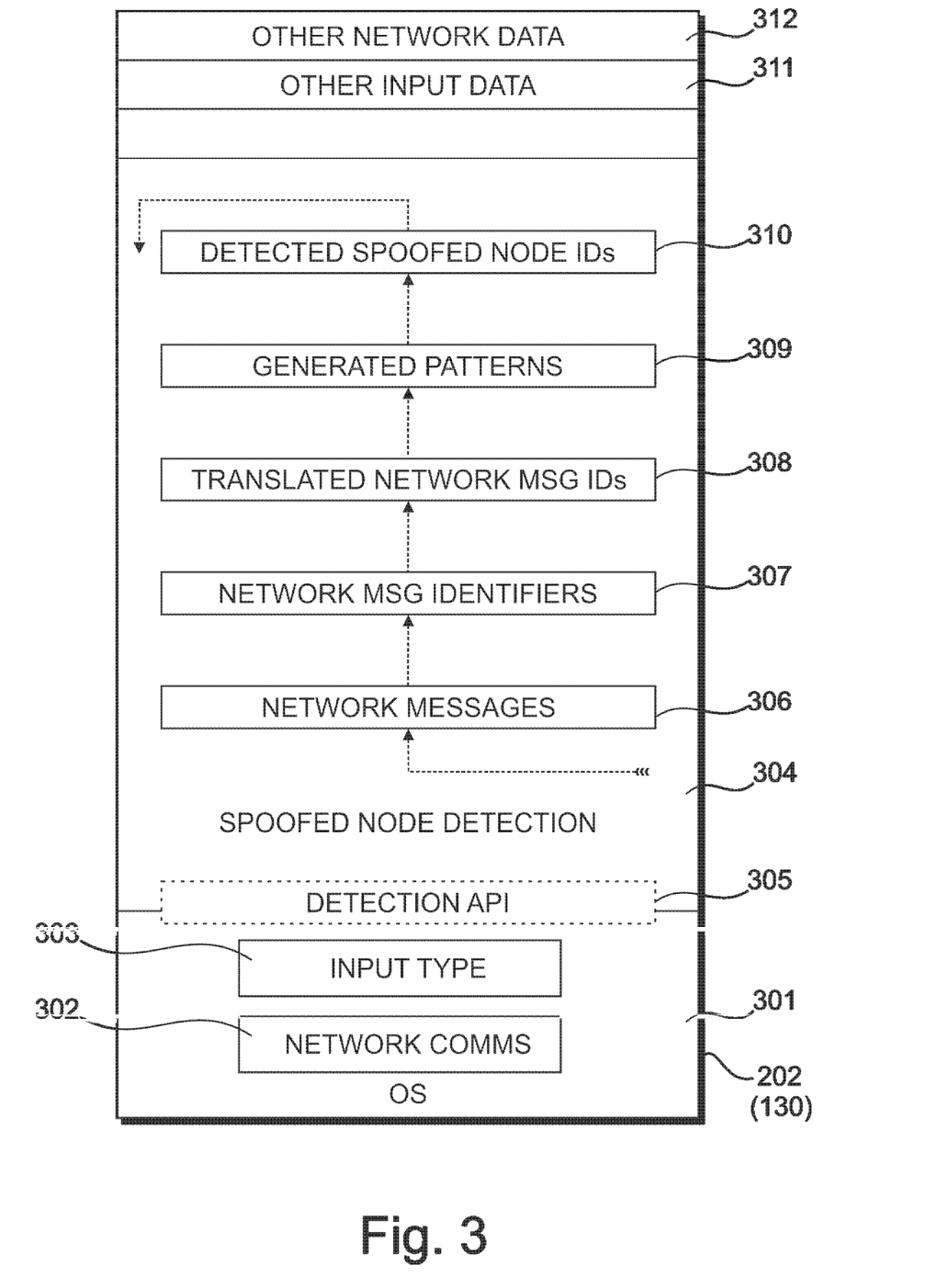
FIG. 3 represents the contents of the memory of FIG. 2 at runtime, including an operating system, a set of instructions and discrete data structures thereof.

With reference now to FIG. 3, a logical diagram illustrates the contents of the memory means 202 of the detecting network node 130 at runtime, when the device is configured for detecting the spoofed network node 120 with the spoofed node detection approach embodied as a set of instructions for the data processing unit 201. An operating system is first shown at 301 which, if the device 130 is for instance an iPhone® mobile phone handset or an iPad® tablet computer manufactured by Apple® Inc. of Sunnyvale, USA, is iOS® likewise distributed by Apple® Inc.; or, if the device 130 is for instance a Galaxy® mobile phone handset manufactured by Samsung® Electronics Co., Ltd of Suwon, Republic of Korea, is Android® distributed by Google® Inc. The OS 301 includes communication subroutines 302 to configure the data processing terminal 130 for bilateral network communication via the modem 203 and both the NIC 206A and the NFC module 206B. The OS 301 also includes input subroutines 303 for reading and processing input data variously consisting of user direct input to the keypad 208 and to the touchscreen interface 209, image data captured by the CCD 211 and audio data supplied by the DAC 204 after processing input from the microphone 210.

Figure 4:
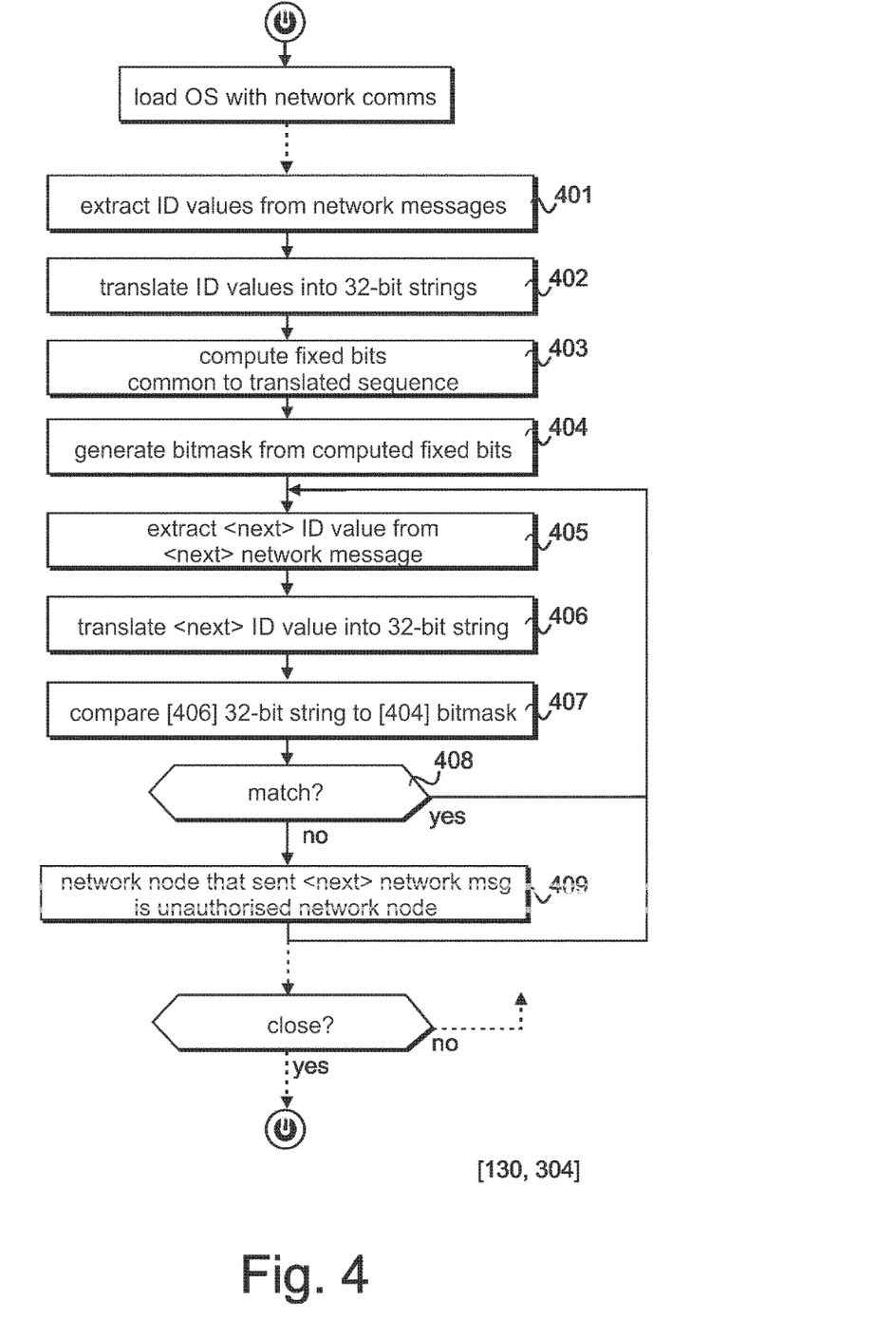
FIG. 4 details steps of a main logic performed at the detecting network node shown in FIGS. 1 to 3 for detecting the spoofed network node based on a first pattern inherent to a sequence of network message identifiers, according to the method of the invention.

A spoofed node detection application is shown at 304, which configures the network node 130 to perform data processing steps described hereafter with reference to FIGS. 4 to 6 to detect the spoofed node 120 in the networked environment of FIG. 1. The application 304 is interfaced with the OS 301, particularly the network communication and input data processing subroutines 302 and 303 of the OS 301, via one or more suitable Application Programmer Interfaces 305.

Network messages sequentially received by the detecting network node 130 from their remote originating network node 110, 120 are shown at 306. Respective identifier values encoded in the plurality of network messages and extracted by the application 304 according to the methodology described hereafter are shown at 307. Identifier values 307 translated into respective 32-bit strings by the application 304 as part of the said methodology are shown at 308. Patterns generated by the application 304 against which to compare identifier values for detecting unauthorised nodes 120 are shown at 309, and identifier values or other suitable characteristic uniquely identifying nodes detected as unauthorised by the application are shown at 310.

Further local data 311 and network data 312 may be stored in the memory means 202 of the network node 130 at runtime, some or all of which may be processed either by the application 304, or by or for other application(s) being processed in parallel with the application 304. An example of further local data is for instance local user input 311 read by the OS 301 in real time from the hardware interface 209. An example of further network data is for instance remote application or OS updating data 312 communicated by a remote server across the telecommunication network 170.

The main logic performed by the spoofed node detection application 304 for detecting the spoofed network node 120 according to a first embodiment of the invention, is shown as data processing steps with reference to FIG. 4.

This embodiment is based on the finding that a sequence of OTIDs originated from a specific node 110, 120 exhibits a pattern of fixed bits, i.e. bits at set locations in the sequence which never change their respective value, after translating the OTIDs into binary notation. As an example, a subset of the bits can be used to compute an invariant. Each OTID in a sequence is translated as a corresponding 32-bit binary expression. It will be appreciated that other techniques can be used such as identifying an invariant bases on a subset of a bitmask.

On the reasonable assumption that the unauthorised node 120 would generate a TID value randomly when sending a spoofed TC-BEGIN network message, then a comparison of that random TID value translated into a corresponding 32-bit binary expression with the known invariant associated with a legitimate node 110, would have a high probability of detecting the spoofed message.

In one embodiment after the network node loads the spoofed node detection application 304 into the memory 202 and begins to execute according to the instructions, at step 401 the application 304 extracts a sequence of OTIDs encoded in network messages $306_{1-N}$ by their remote originating network node 110, 120 by way of identifier values $307_{1-N}$. At step 402, the application 304 translates each of the plurality of identifier values 307 into a respective 32-bit string 308. At step 403, the application 304 computes a position and value of any fixed bit(s) common to the translated plurality of bit strings 308, i.e. those bits having an identical value at an identical position in each expression of the sequence. At step 404, the application generates a bitmask 309 according to the output of step 403, completing the training phase of the detection method.

Upon receiving a subsequent network message $306_{N+1}$ comprising an OTID encoded therein by a remote originating network node 110, 120 by way of identifier value $307_{N+1}$, at step 405 the application 304 extract the OTID from the subsequently-received network message $306_{N+1}$ and translates the identifier value $307_{N+1}$ into a respective 32-bit string 308 at step 406. At step 407, the application 304 compares the 32-bit string 308 output by step 406 to the bitmask 309 and a question is asked at step 408, about whether the 32-bit string exhibits the same fixed bits comprising the bitmask.

If the question of step 408 is answered positively, the network message is deemed to have been sent by a legitimate network node 110 and control returns to step 405 for processing a subsequent network message $306_{N+2}$. Alternatively, the question of step 408 is answered negatively, wherein the network message is deemed to have been sent by the spoofed node 120 and, at step 409, the remote network node 120 is declared as unauthorised. An alert event and/or network security policy may be triggered in accordance with the determination, according to techniques known to the skilled person.

The bitmask-based detection described with reference to FIG. 4 is considered the least computationally-intensive embodiment of the method and readily adaptable to either a SS7 network context with processing OTIDs by way of identifier values, or a Diameter network context with processing H-IDs or E-IDs by way of identifier values. However, the accuracy of the detection may be improved with the addition of a secondary analysis based on a second pattern independently performed after the first pattern-based detection, wherein the spoofed node detection application 304 is effectively adapted to perform a dual-stage detection method.

Accordingly, in a further embodiment described with reference to FIG. 5, regardless of the answer provided to the comparison question of step 408, the method proceeds onto generating a second statistical pattern inherent to the sequence of network messages, from the plurality of identifier values associated with the legitimate network node at step 501, and comparing the identifier value encoded in the subsequent network message with the second statistical pattern at step 502. A question is again asked at step 503, about whether the identifier value encoded in the subsequent network message conforms to or diverges from the second statistical pattern.

If the question of step 503 is answered positively, the network message is deemed to have been sent by a legitimate network node 110 and control returns to step 502 for processing a subsequent network message $306_{N+2}$. Alternatively, the question of step 503 is answered negatively, wherein the network message is deemed to have been sent by the spoofed node 120 and, at step 504, the remote network node 120 is declared as unauthorised. An alert event and/or network security policies may again be triggered in accordance with the determination, according to techniques known to the skilled person.

Figure 5:
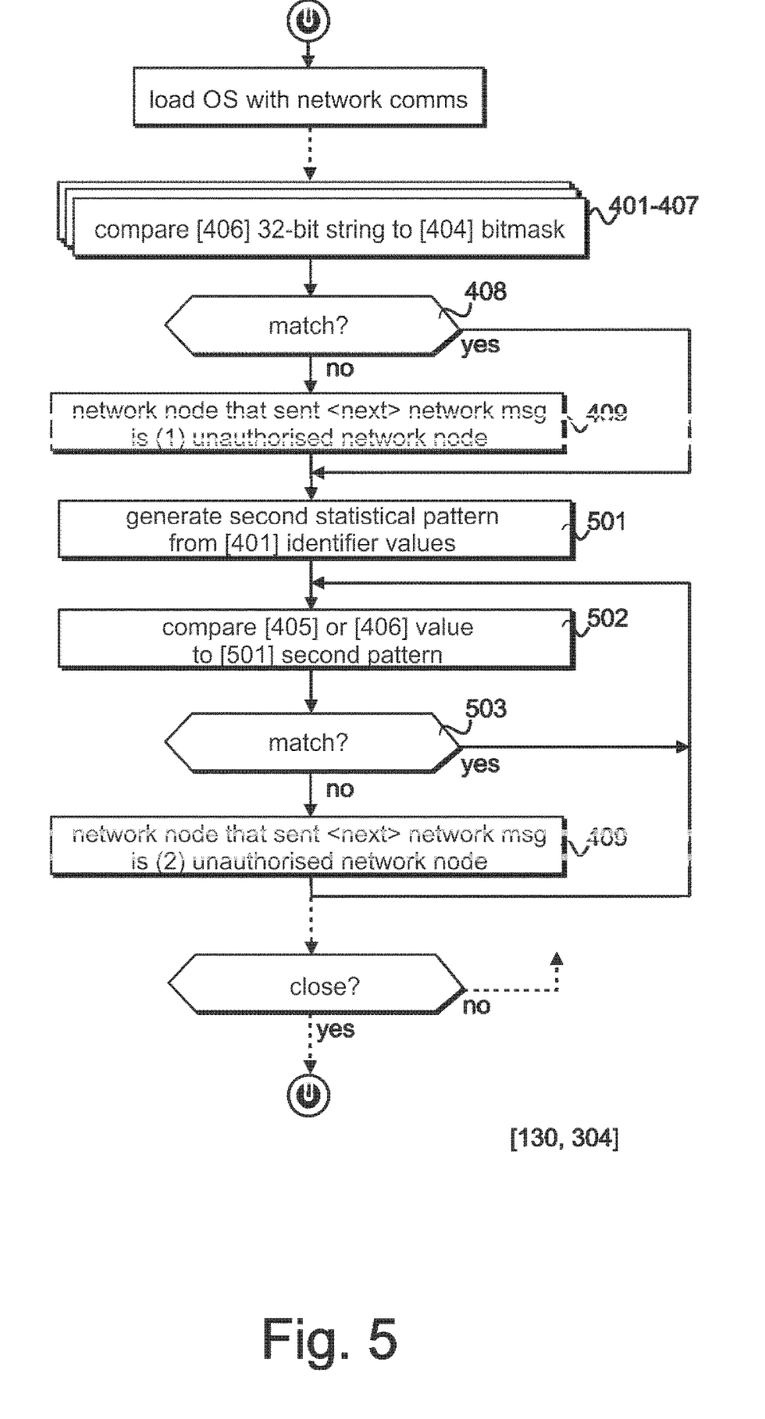
FIG. 5 details an alternative embodiment of the method shown in FIG. 4, including a secondary detection stage based on a second pattern inherent to a sequence of network message identifiers.

An implementation of the embodiment shown in FIG. 5, which is considered particularly suitable for SS7-based networks, bases the second stage on the statistical correlation between the non-fixed bits of the OTIDs sequence.

An experiment was conducted by calculating correlation coefficients between bits of the 32-bit TID for a selection of networks nodes 110. The correlations were calculated using a large block of samples, by treating each bit in the translated OTIDs as an independent variable, whereby the resulting correlation coefficient matrix for each network node 110 had a 32×32 size. Fixed bits in OTIDs were unsurprisingly found to be fully correlated (correlation between a bit and itself), however most network nodes 110 showed significant correlation between groups of adjacent non-fixed bits. This property was deemed to indicate that an OTID with randomised bits, such as generated by a spoofed node 120, should have a good likelihood of being detected by comparing it to adjacent OTIDs in a sequence of OTID values, using the known transition frequencies for the network node 110. For obtaining good confidence that any particular transition does not occur, the number of samples used to populate the matrix should be relatively high, compared to the total number of possible transitions.

Adverting to the above principle, the spoofed node detection application 304 may initially order a network node's TC-BEGIN OTID samples by their time-stamps then take a sequence of samples of the available OTID data $307_{1-N}$ for a given network node 110. The application 304 identifies a field of n non-fixed bits, which have high aggregate pair-wise correlation coefficients over the sequence of samples. The N samples are converted to binary, i.e. 32-bit vectors, and the bit-wise correlation coefficients across all samples are computed, treating each of the 32 bits as a separate random variate, bi, i=0, 1, 2, . . . , 31. This step outputs a 32×32 matrix of correlation coefficients. These n bits are then converted, in each OTID sample, to a decimal integer. Infinite values in the matrix that are caused by fixed bits and main diagonal entries are set to zero, absolute values are taken and maximum values in each row (or equivalently, column) are selected, yielding a 32-length vector rmax. The m largest correlation values in rmax are identified as a binary-valued 32-bit vector rsup. The non-zero values of this vector rsup identify candidate bits that can be chosen for construction of the second pattern: due to strongly correlated bits generally occurring in groups, the n bits (n∈{2, 3, 4, . . . , 32}, n<m) to be selected to form the second pattern; then given n and rsup, all sets of n non-zero bits in vector rsup, are evaluated to find those n bits that form the optimal second pattern.

To evaluate each candidate second pattern for optimality, a given candidate n bits are extracted from each of the N samples and converted to decimal values (ranging in value from 0 to $2^n-1$). The transition counts between successive decimal values in the sequence of samples are computed iteratively across the N samples, thus forming a transition count matrix of size $2^n \times 2^n$, which is the final output of the modelling phase in the second stage of this method. This transition count matrix is the state-transition probability matrix of the sequence of the decimal values, taken to be the states of a discrete-time chain. The number of zero values in the resulting matrix is then counted. Iterating over all possible n-bit matrices, the matrix with the largest zero transition count is selected as the optimal matrix, denoted Mopt. The locations of the optimal n bits, in the 32-bit field, are recorded as a 32-bit binary-valued vector Bopt.

Further considerations may be given by the skilled reader when implementing this second embodiment for improving its efficiency. For instance, the selection of the optimal bit-field to construct the second pattern is based only on the number of zeroes in the candidate matrices, and these matrices can be built cumulatively with individual incoming OTID samples, on the basis of presumption (pursuant to which fixed-bits in each OTID are assumed to have been determined from the first "fixed bit" analysis stage 403-409, whereby they may be eliminated from inclusion in candidate second pattern bit-fields), initialisation (pursuant to which, for each network node, Cn transition count matrices can be computed, each of size 2n×2n, where n is the chosen bit-field size parameter and Cn is the number of n-length bit-fields in the non-fixed bits of the OTID and, for each of the Cn candidate bit-fields, make the set of corresponding bitmasks B) and lastly a transition counting procedure (for each OTID value received, mask the 32-bit value with each bitmask in B and convert each result to decimal, index each transition count matrix using the corresponding current and previous OTID decimal indices, and increment the count at that index, then for each matrix, maintain a count of the current number of entries that have not been incremented).

The above alternative based upon SS7-TCAP OTIDs is incompatible with Diameter-based networks, however the notion of a secondary analysis based on a second pattern independently performed after the first bitmap-based detection, and the associated benefit of an improved detection accuracy, may still be extended to Diameter-based networks with an implementation of the embodiment shown in FIG. 5 basing the second stage on the analysis of how time-series of legitimate H-ID and/or E-ID values can be modelled and predicted, so that spoofed H-ID or E-ID identifiers which do not follow the second pattern for a given source network node, can be detected.

In one embodiment clusters of IDs on an "ID vs Time" chart are located, and a prediction can be made if a new ID is close enough or not to the existing cluster. For example during the detection phase, the application 304 fixes the number of clusters to each network node 110, 120 that completed the second pattern generating phase and, upon receiving a subsequent network message from which it extracts a new identifier, the application 304 processes a linear regression on the last n identifier values for that network node, wherein n is again an a priori fixed constant, for instance in the range 20 to 30. The expected value of the next identifier value in the sequence at a specific time is again computed, and the question of step 503 is asked. If the new identifier value falls in the range of the admissible values of one of the existing sequences, then it is considered safe and it becomes part of that sequence, whereby the question of step 503 is answered positively. But if the new identifier value falls outside the range of the admissible values of all the sequences for that network node 120, then it does not become part of any sequence and the question of step 503 is answered negatively, resulting in the declaration of that network node 120 as an unauthorised mode.

Accordingly, the invention disclosed herein provides a method of detecting an unauthorised node in a telecommunication network, through detecting and modelling one or more patterns inherent to network message identifiers encoded by network nodes in their signals according to network protocol requirements, then comparing subsequent network message identifiers to the modelled patterns for divergence from same. The method is highly modular, exhibit levels of accuracy scalable according to computational resources made available and readily applicable both to legacy PSTN-based telecommunication networks and their more modern IP-based successors.

According to another aspect of the invention the method described herein can be applied GPRS Tunneling Protocol (GTP) which is an Internet Protocol (IP) based protocol suite used to carry general packet radio service (GPRS) within the following networks: Universal Mobile Telecommunications System (UMTS) 3GPP Long Term Evolution (LTE) and Global System for Mobile Communications (GSM). It was found that the sequence of Tunnel Endpoint IDentifier TEID associated by the GTP Host to each "Create Session Request" message exhibits the "Fixed-bits mask" pattern, i.e. even though the sequence of values seems to be random, a subset can be found of bits that never change. This means that it is possible to identify a Host by its pattern, and identify a spoofed or suspicious source using the methodology of the invention.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A method of detecting an unauthorised communication from a network node in a telecommunication network, comprising the steps of:
generating a first statistical pattern inherent to a sequence of network messages, from a plurality of identifier values associated with a legitimate network node, wherein each identifier value has been encoded by the legitimate network node in a respective network message;
comparing an identifier value encoded in a subsequent network message of a signalling network node with the first statistical pattern;
when the comparison against the first pattern outputs a mismatch, declaring communication from the signalling network node as unauthorised or suspicious;
generating a second statistical pattern inherent to the sequence of network messages;
translating each of the plurality of identifier values into a respective bit string si;
sampling the translated bit strings $si_{1-N}$;
identifying a field of n non-fixed bits in the sequence of samples;
converting the identified n non-fixed bits to a decimal integer di;
calculating transition counts between successive decimal values $di_{1-N}$ in the sequence of samples to form the second statistical pattern; and when the comparison against the first and second pattern outputs a mismatch, declaring the signalling network node as unauthorised, wherein the second statistical pattern is a state-transition probability matrix Mopt of the sequence of decimal values.

2. A method according to claim 1, wherein the second statistical pattern is generated from the plurality of identifier values associated with the legitimate network node, the method comprising the further step of:
comparing the identifier value encoded in the subsequent network message with the second statistical pattern.

3. A method according to claim 1, wherein the step of generating the first statistical pattern comprises the further steps of:
translating each of the plurality of identifier values into a respective bit string or a bitwise-inverse bit string, based on the comparison with the previous value;
identifying a position and value of at least one fixed bit common to the translated plurality of bit strings; and
generating a bitmask from the identified fixed bits.

4. A method according to claim 3, wherein the step of comparing against the first pattern comprises the further steps of:
translating the identifier value encoded in the subsequent network message into a respective bit string; and
comparing the respective bit string with the bitmask.

5. A method according to claim 1 wherein the telecommunication network is a Signalling System number 7 ('SS7') network.

6. A method according to claim 5, wherein the step of comparing the identifier value encoded in the subsequent network message with the second statistical pattern outputs a mismatch when either $Mopt(di_{N-1},di_N)$ or $Mopt(di_N,di_{N+1})$ is equal to zero.

7. A method according to claim 5, wherein the step of comparing the identifier value encoded in the subsequent network message with the second statistical pattern outputs a mismatch when both $Mopt(di_{N-1},di_N)$ and $Mopt(di_N,di_{N+1})$ are equal to zero.

8. A method according to claim 5, wherein a default count for n in the step of identifying the contiguous field of n non-fixed bits in the sequence of samples, is 4.

9. A method according to claim 1, wherein the identifier value is an Originating Transaction Identifier ('OTID').

10. A method of detecting an unauthorised communication from a network node in a telecommunication network, comprising the steps of:
generating a first statistical pattern inherent to a sequence of network messages, from a plurality of identifier values associated with a legitimate network node, wherein each identifier value has been encoded by the legitimate network node in a respective network message;
comparing an identifier value encoded in a subsequent network message of a signalling network node with the first statistical pattern;
when the comparison against the first pattern outputs a mismatch, declaring communication from the signalling network node as unauthorised or suspicious;
generating a second statistical pattern inherent to the sequence of network messages, from the plurality of identifier values associated with the legitimate network node, including:
determining at least one sequence of identifier values in the plurality of identifier values associated with the legitimate network node;
for each determined sequence, computing a linear regression of a sub-set of monotonically-increasing identifier values thereof; and
calculating an expected value range for a next identifier value in the sequence;
comparing the identifier value encoded in the subsequent network message with the second statistical pattern; and
when the comparison against the first and second pattern outputs a mismatch, declaring the signalling network node as unauthorised.

11. A method according to claim 10, wherein the step of comparing the identifier value encoded in the subsequent network message with the second statistical pattern outputs a mismatch when the identifier value encoded in the subsequent network message is outside the calculated expected value range.

12. A method according to claim 10, wherein each identifier value is either or each of a Hop-by-Hop Identifier and an End-to-End Identifier.

13. A non-transitory computer-readable medium storing computer-executable instructions that, when executed by at least one processor, configure the at least one processor to:
receive network messages in a telecommunication network;
generate a first statistical pattern inherent to a sequence of received network messages, from a plurality of identifier values associated with a legitimate network node, wherein each identifier value has been encoded by the legitimate network node in a respective network message;
compare an identifier value encoded in a subsequent network message of a signalling network node with the first statistical pattern;
when the comparison against the first pattern outputs a mismatch, declare communication from the signalling network node as unauthorised or suspicious;
generate a second statistical pattern inherent to the sequence of network messages, from the plurality of identifier values associated with the legitimate network node, including:
determining at least one sequence of identifier values in the plurality of identifier values associated with the legitimate network node;
for each determined sequence, computing a linear regression of a sub-set of monotonically-increasing identifier values thereof; and
calculating an expected value range for a next identifier value in the sequence;
comparing the identifier value encoded in the subsequent network message with the second statistical pattern; and
when the comparison against the first and second pattern outputs a mismatch, declaring the signalling network node as unauthorised.

* * * * *